(12) United States Patent
Cope

(10) Patent No.: US 11,460,374 B1
(45) Date of Patent: Oct. 4, 2022

(54) ENGINE TESTING MECHANISM

(71) Applicant: David M. Cope, Pryor, OK (US)

(72) Inventor: David M. Cope, Pryor, OK (US)

( * ) Notice: Subject to any disclaimer, the term of this patent is extended or adjusted under 35 U.S.C. 154(b) by 16 days.

(21) Appl. No.: 17/095,094

(22) Filed: Nov. 11, 2020

(51) Int. Cl.
*G01M 15/02* (2006.01)
*G01M 15/04* (2006.01)

(52) U.S. Cl.
CPC .......... *G01M 15/02* (2013.01); *G01M 15/044* (2013.01)

(58) Field of Classification Search
CPC ............................. G01M 15/02; G01M 15/044
See application file for complete search history.

(56) References Cited

U.S. PATENT DOCUMENTS

| | | | |
|---|---|---|---|
| 4,520,773 A * | 6/1985 | Koslow | F02B 77/04 123/198 A |
| 4,831,560 A | 5/1989 | Zaleski | |
| 5,177,447 A | 1/1993 | Marino et al. | |
| 5,532,927 A | 7/1996 | Pink et al. | |
| 6,314,375 B1 | 11/2001 | Sasaki et al. | |
| 8,666,642 B2 | 3/2014 | Stempnik et al. | |
| 9,704,307 B2 | 7/2017 | Owen et al. | |

* cited by examiner

*Primary Examiner* — Eric S. McCall
(74) *Attorney, Agent, or Firm* — Cramer Patent & Design, PLLC; Aaron R. Cramer

(57) ABSTRACT

An engine testing system has a control box having a plurality of internal components such as switches for starting and stopping the engine, a switch to enable or disable the fuel injectors, a voltage meter, circuit breakers and fuses that supply power to auxiliary circuits, and the like. The testing system further has two large spring-loaded clamps, which are attached to heavy gauge cables, which allow for the connection of a battery.

20 Claims, 7 Drawing Sheets

ENGINE TESTING MECHANISM

RELATED APPLICATIONS

Non-applicable.

FIELD OF THE INVENTION

The invention relates generally to a testing system and more specifically to an engine testing system.

BACKGROUND OF THE INVENTION

As anyone who performs a lot of physical work will attest, nothing beats having the proper tool for a job. The proper tool can save time, save money, produce a higher quality job, reduce damage to equipment, and provides for the increased safety of the worker. Each field of physical work has its own type of specialty tools, each performing a specialized task. One particular type of work found around diesel engine work is testing after repairs have been made. Should the engine still be in the vehicle, testing is fairly easy and straight forward.

However, if the engine should be removed for major overhaul, testing is somewhat more difficult as multiple electrical interfaces serving as inputs and outputs are not present. While complicated temporary wiring can be put in place, the risk versus reward of simply reinstalling the engine and hoping for the best is usually more attractive. Accordingly, there exists a need for a means by which engines and other vehicle components can be tested while out of a vehicle, but with all electrical power and control interfaces present. The development of the engine testing system fulfills this need.

SUMMARY OF THE INVENTION

The principles of the present invention provide for an engine test box, having a box-like enclosure having a top face, the top face of the box-like enclosure includes a voltage readout, an injector disable/enable switch, and an off/run/start switch all deposed on a first side of the engine test box and an ECM COM power fuse, an ECM circuit breaker, and a start solenoid circuit breaker all deposed on a second side of the engine test box. The engine test box also has a main power switch which is disposed adjacent an upper central part of the box-like enclosure, an ECM connector and a starter solenoid connection which are disposed on an upper face of the box-like enclosure, a com adapter connection which is disposed on the second side of the engine test box, a throttle control knob and a power supply connection which are disposed on the second side of the engine test box. The engine test box also has a plurality of CAN data links and a plurality of data wires connecting a plurality of pins of the ECM connector to the com adapter connection and a plurality of positive and negative lines which are connected at a terminal block, the terminal block functions as a bus connection.

The box-like enclosure may be located in close proximity to an engine under test. A starter solenoid connection may be connected to a starter solenoid on the engine under test via a starter cable. The starter solenoid connection and the power supply connection may be interconnected to a main power relay and a starter relay which are enabled by the main power switch. The ECM connector may be connected to the ECM port on the engine under test via an ECM adapter cable and an ECM extension cable. The ECM extension cable may be provided with a first connector which mates with the ECM connector. The first connector may be a 160-7690 PLUG AS AMP 776-2412.

A second connector may mate with the starter solenoid connection and the power supply connection and provides an electrical connection to the starter solenoid on the starter as well as to the battery system. The second connector may be a plurality of high current spring clamps. The com adapter connection on the box-like enclosure may be connected to a communication module. The com adapter connection on the box-like enclosure may be connected to a computer. The power supply connection may be connected to a battery system via a battery cable. The battery cable may carry power from the battery system to the engine under test. The throttle control knob may be connected to the ECM connector by a sensor supply positive wire and a sensor return positive wire.

The engine test box may be connected to an adapter harness for a CAT 3408E engine or a CAT 3412E engine. The adapter harness for the CAT 3408E and the 3412E engines may include a third connector which mates with the ECM connector or with the ECM extension cable. The pins of the third connector may be connected to the first connector with a distal end of the ECM extension cable specific to the engine under test. The adapter harness for a 3456 engine may be provided with a fourth connector which mates with the ECM connector or with the ECM extension cable.

A plurality of pins of the fourth connector may be connected to the second connector with a distal end of the ECM extension cable specific to the engine under test. The adapter harness for a 3456 engine may be provided with a fifth connector which mates with the ECM connector or with the ECM extension cable.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 engine test box
- 15 enclosure
- 20 voltage readout
- 25 injector disable/enable switch
- 30 off/run/start switch
- 35 ECM COM power fuse
- 40 ECM circuit breaker
- 45 start solenoid circuit breaker
- 50 ECM connector
- 55 starter solenoid connection
- 60 com adapter connection
- 65 throttle control knob
- 70 power supply connection
- 75 engine under test
- 80 ECM port
- 85 ECM adapter cable
- 90 ECM extension cable
- 95 starter solenoid
- 100 starter cable
- 105 communication module
- 110 battery system
- 115 battery cable
- 120 primary battery cables
- 125 sensor supply positive wire
- 130 sensor return positive wire
- 135 CAN data link
- 140 CAT data wire
- 145 main power relay
- 150 starter relay
- 155 main power switch
- 160 terminal block
- 165 first connector
- 170 second connector
- 175 starter
- 180 high current spring clamp
- 185 adapter harness for a CAT 3408E and 3412E engine
- 190 third connector
- 195 first proprietary connector
- 200 adapter harness for a 3456 engine
- 205 fourth connector
- 210 second proprietary connector
- 215 adapter harness for implement and power train controller of G and H series loader
- 220 fifth connector
- 225 third proprietary connector

DESCRIPTION OF THE PREFERRED EMBODIMENTS

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
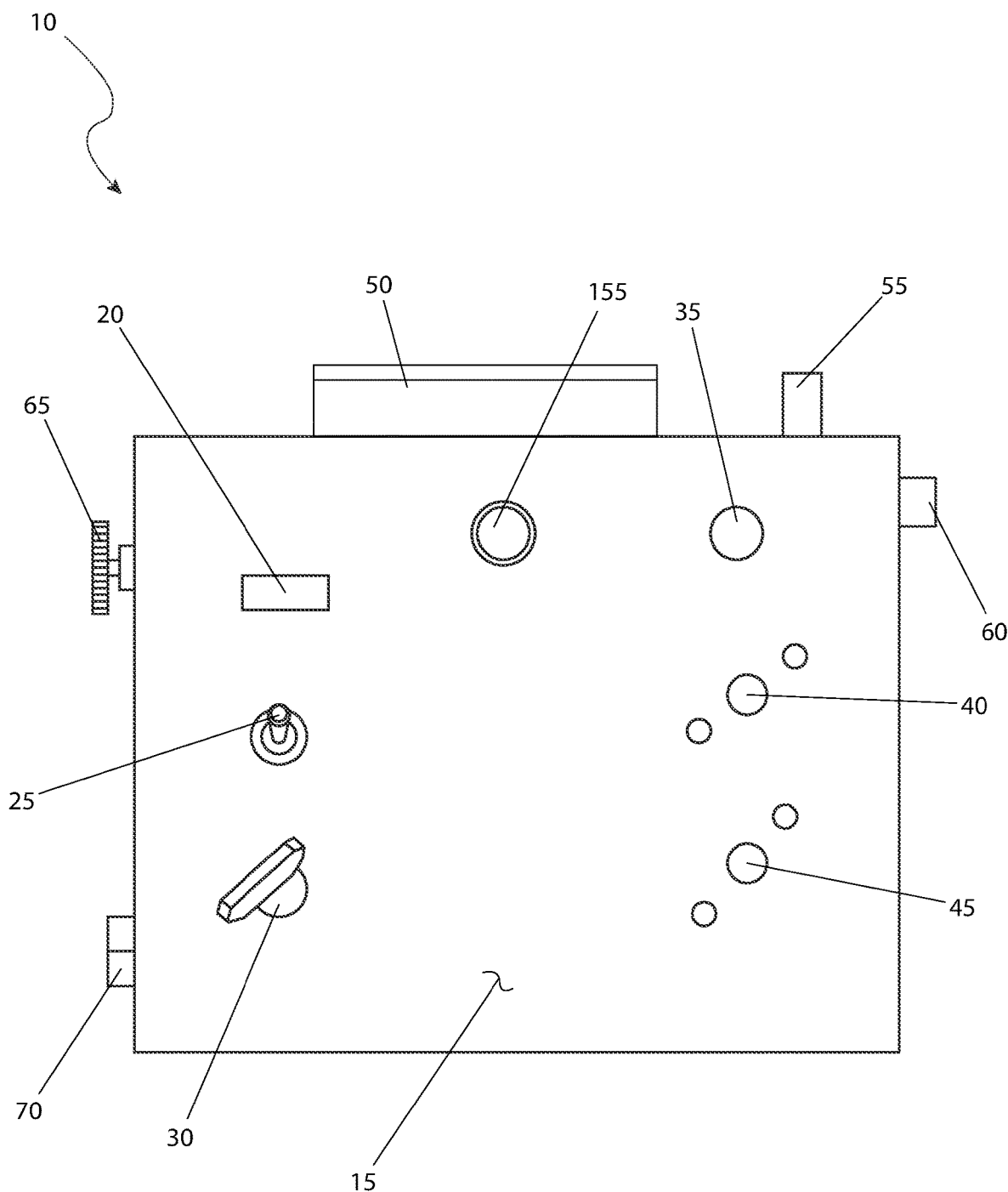
FIG. 1 is a front view of the engine test box, according to the preferred embodiment of the present invention.

Referring now to FIG. 1, a front view of the engine test box 10, according to the preferred embodiment of the present invention is disclosed. The engine test box 10 (herein also described as the "test box") 10, provides the ability to test engines by arranging multiple electrical devices and cabling that mimics the electrical infrastructure of the vehicle in which it is normally installed. The invention provides a box-like enclosure 15 with the approximate dimensions of twelve inches (12 in.) wide, twelve inches (12 in.) high, and eight inches (8 in.) deep. The top face of the enclosure 15 is provided with a voltage readout 20, an injector disable/enable switch 25, and an off/run/start switch 30 on the left side of the invention. An ECM COM power fuse 35, an ECM circuit breaker 40, and a start solenoid circuit breaker 45 is provided on the right side of the invention. Located adjacent an upper central part of the enclosure 15 is a main power switch 155. The upper face of the enclosure 15 is provided with an ECM connector 50 and a starter solenoid connection 55. The right face of the enclosure 15 is provided with a com adapter connection 60. The left face of the enclosure 15 is provided with a throttle control knob 65 and a power supply connection 70.

Figure 2:
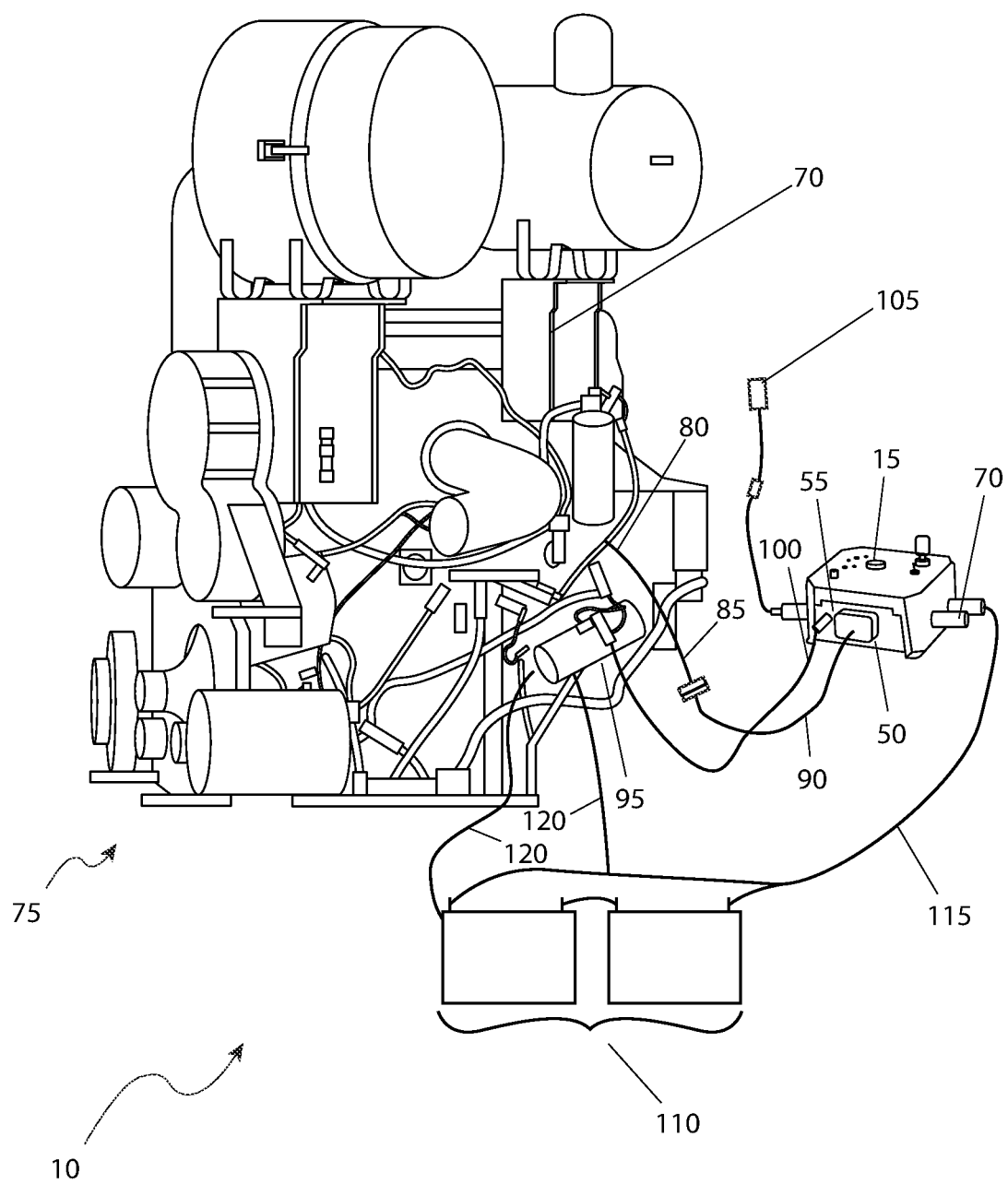
FIG. 2 is a perspective view of the engine test box, shown in a utilized state, according to the preferred embodiment of the present invention.

Referring next to FIG. 2, a perspective view of the test box 10, shown in a utilized state, according to the preferred embodiment of the present invention is depicted. The enclosure 15 is located in close proximity to an engine under test 75. The ECM connector 50 is connected to the ECM port 80 on the engine under test 75 via an ECM adapter cable 85 and an ECM extension cable 90. The ECM adapter cable 85 will be described in greater detail herein below. The starter solenoid connection 55 is connected to a starter solenoid 95 on the engine under test 75 via a starter cable 100. The com adapter connection 60 on the enclosure 15 is connected to a communication module 105 or similar device such as a computer. The power supply connection 70 is connected to a battery system 110 via a battery cable 115. Primary battery cables 120 carry power from the battery system 110 to the engine under test 75.

Figure 3:
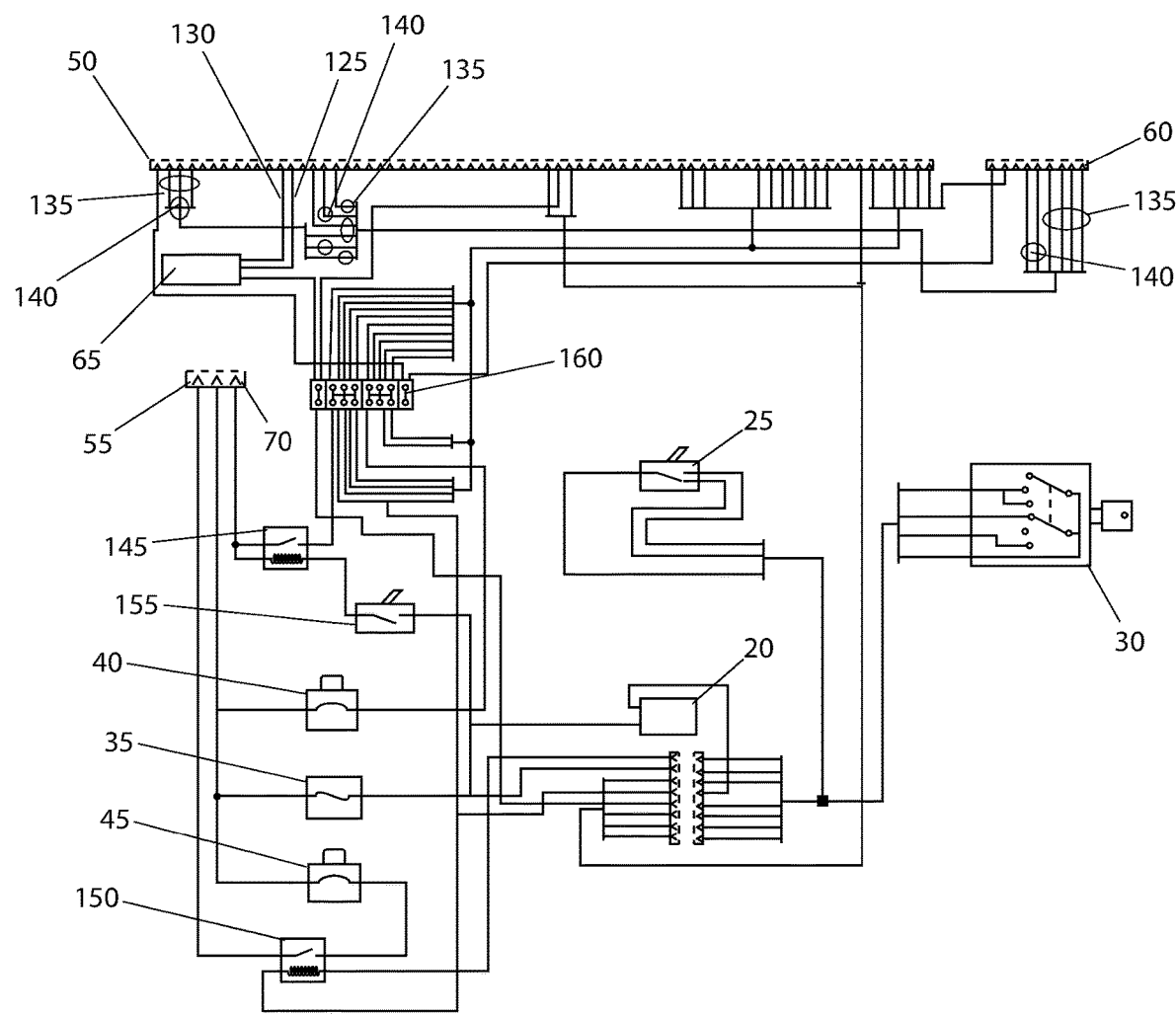
FIG. 3 is a schematic diagram of the interior of the engine test box, according to the preferred embodiment of the present invention.

Referring now to FIG. 3, a schematic diagram of the interior of the test box 10, according to the preferred embodiment of the present invention is shown. The throttle control knob 65 is connected to the ECM connector 50 by a sensor supply positive wire 125 and a sensor return positive wire 130. CAN data links 135 and CAT data wires 140 connect appropriate pins of the ECM connector 50 to the com adapter connection 60. Additional wiring connect the switched positive power lines, the unswitched positive power lines, the ground connection, the starting circuit, the digital return and the positive battery key off only circuit with the injector disable/enable switch 25, the 30, the voltage readout 20, the ECM COM power fuse 35, the ECM circuit breaker 40, and the start solenoid circuit breaker 45. The starter solenoid connection 55 and the power supply connection 70 are interconnected to a main power relay 145 and a starter relay 150 which are enabled by the main power switch 155. Various positive and negative lines are connected at a terminal block 160, which functions as a bus connection.

Figure 4:
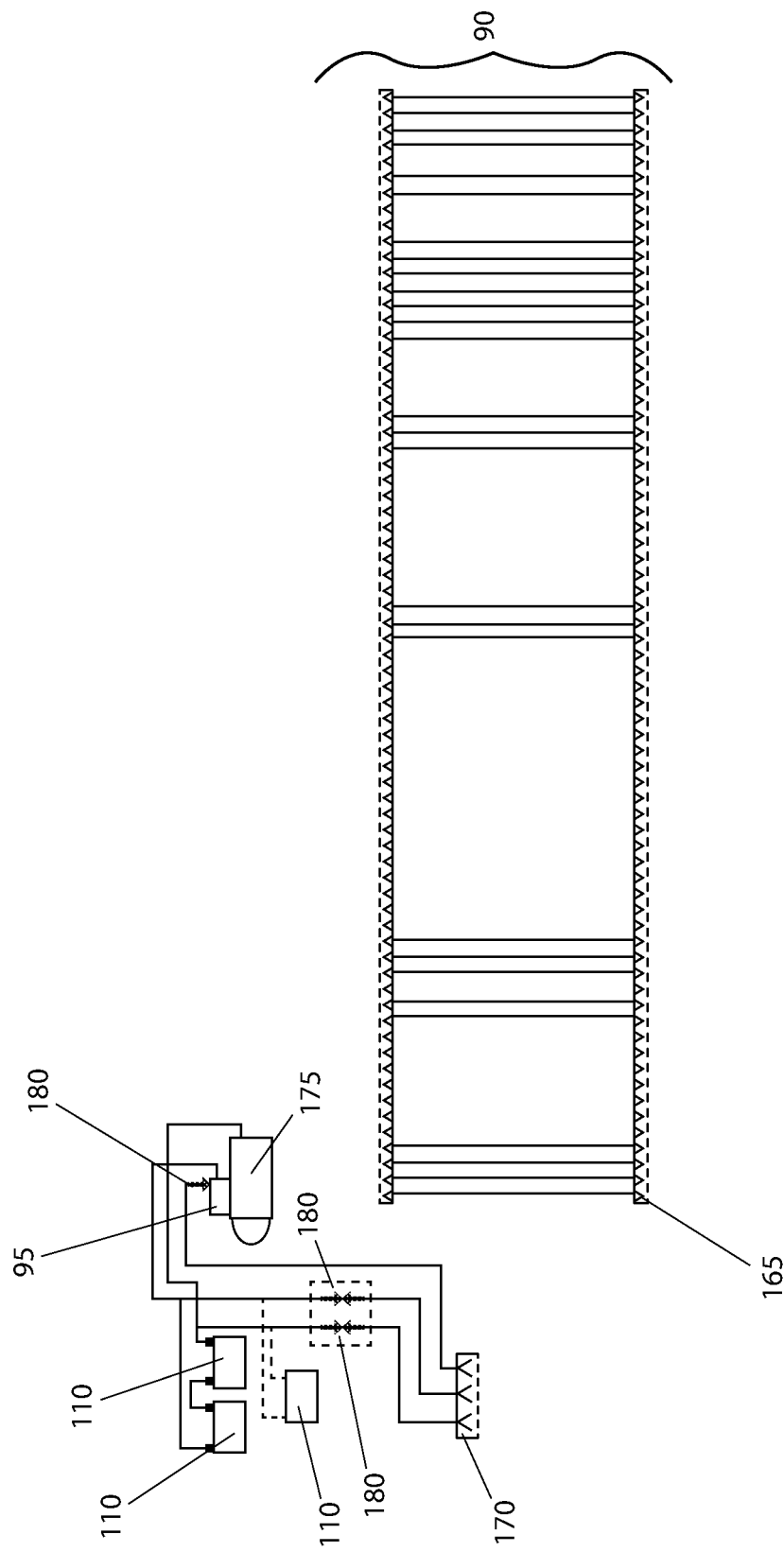
FIG. 4 is a schematic diagram of engine test box, depicting external connections and the ECM extension cable, as used with the engine test box, according to the preferred embodiment of the present invention.

Referring next to FIG. 4, a schematic diagram of test box 10, depicting external connections and the ECM extension cable 90, as used with the engine test box 10, according to the preferred embodiment of the present invention is disclosed. The ECM extension cable 90 is provided with a first connector 165 which mates with the ECM connector 50 (as shown in FIG. 1 and FIG. 2) and is envisioned to be a 160-7690 PLUG AS AMP 776-2412 or equal. The distal end of the extension cable is provided with a mating plug and is wired on straight through connection with mating pins connected. A second connector 170 then mates with the starter solenoid connection 55 and the power supply connection 70 (as shown in FIG. 1 and FIG. 3) and provides an electrical connection to the starter solenoid 95 on the starter 175 as well as to the battery system 110, via a series of high current spring clamps 180.

Figure 5:
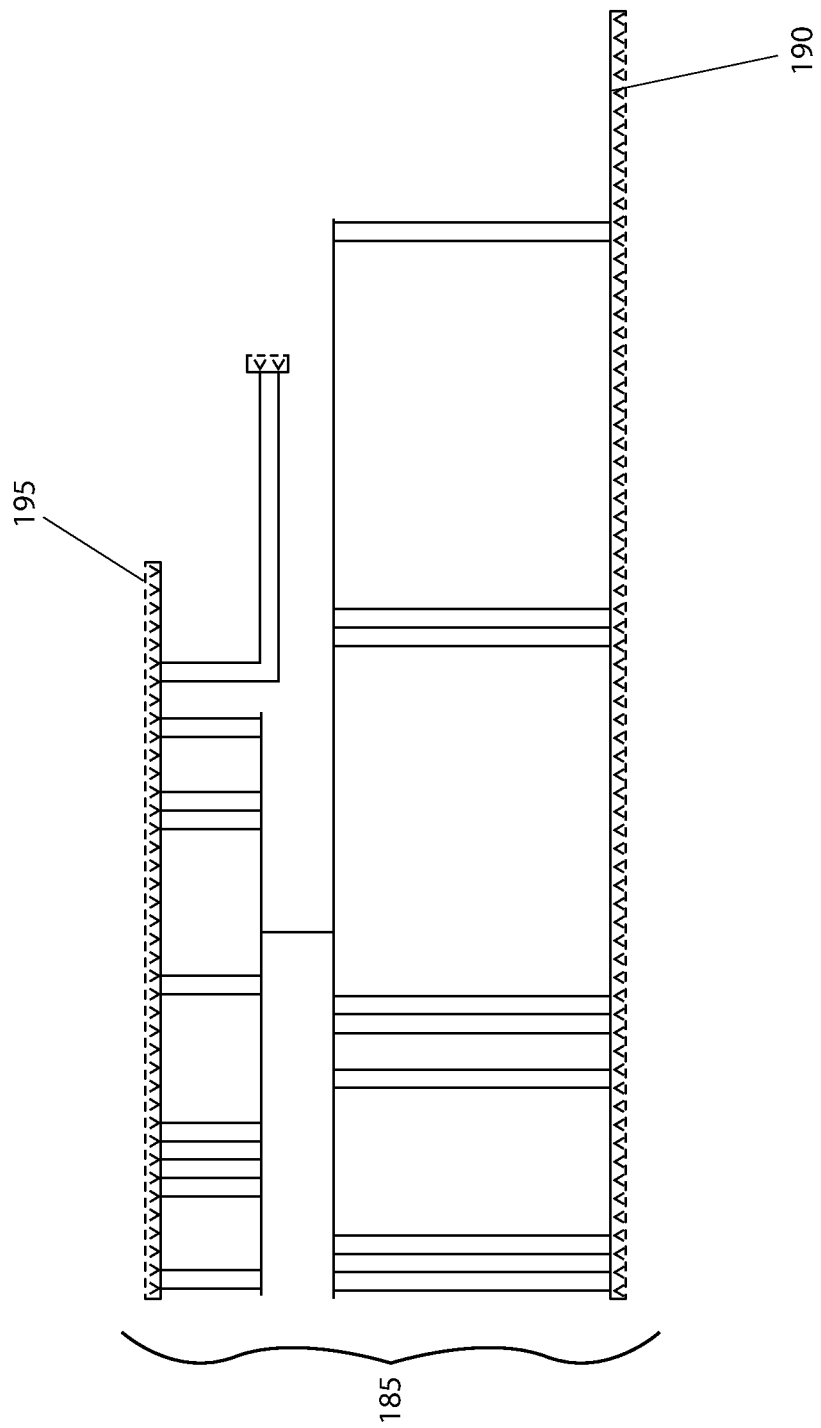
FIG. 5 is a schematic diagram of the engine test box, depicting connections for an adapter harness for a CAT 3408E and 3412E engines, according to the preferred embodiment of the present invention.

Referring now to FIG. 5, a schematic diagram of the test box 10, depicting connections for an adapter harness for a CAT 3408E and 3412E engines 185, according to the preferred embodiment of the present invention is depicted. The adapter harness for a CAT 3408E and 3412E engines 185 provides a is provided with a third connector 190 which mates with the ECM connector 50 (as shown in FIG. 1 and FIG. 2), or with the ECM extension cable 90 (as shown in FIG. 2) and is envisioned to be a 160-7690 PLUG AS AMP 776-2412 or equal. The distal end of the extension cable is provided with a first proprietary connector 195 specific to the engine under test 75 (as shown in FIG. 2) under test. The connections from the pins of the third connector 190 are connected to the first proprietary connector 195 as shown.

Figure 6:
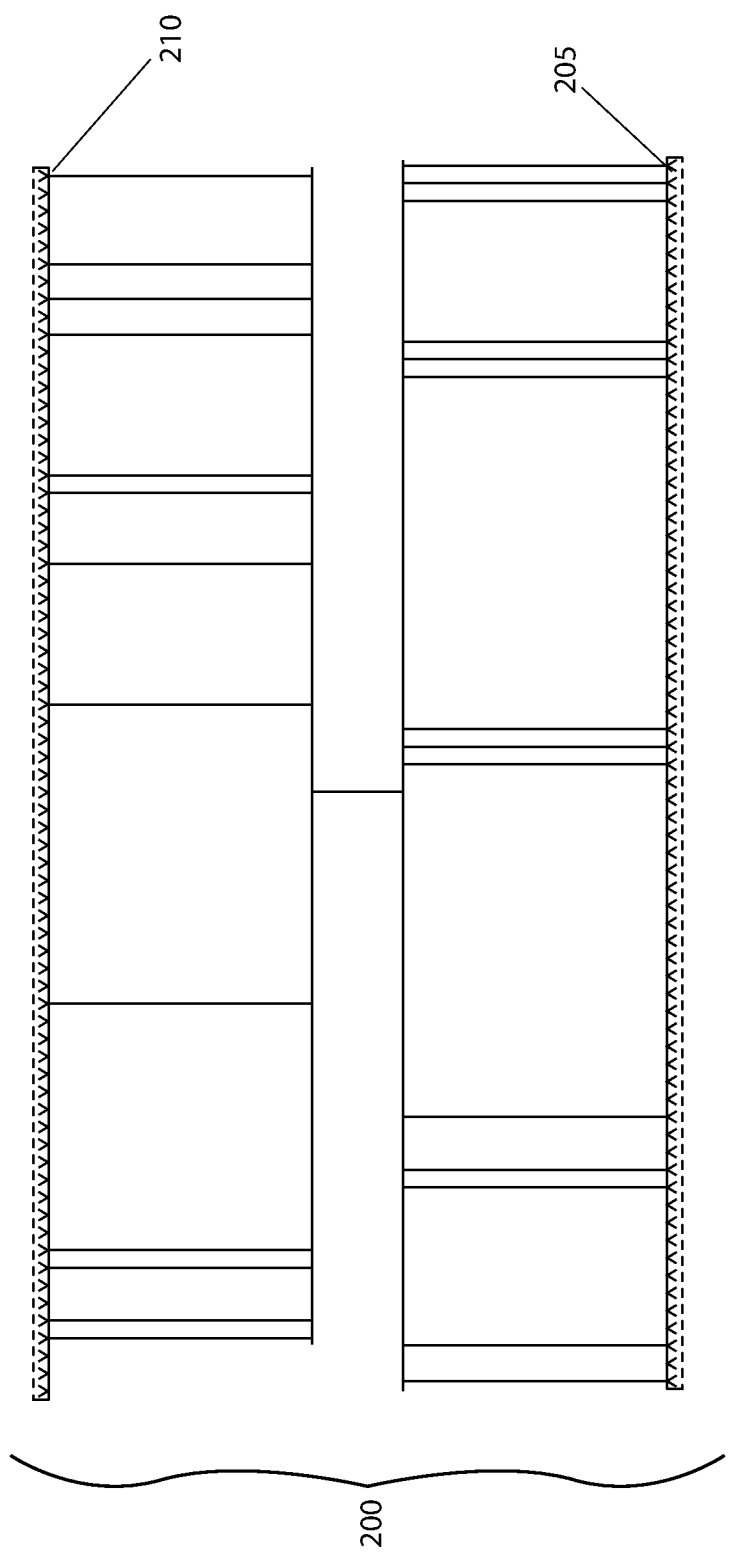
FIG. 6 is a schematic diagram of the engine test box, depicting connections for an adapter harness for a 3456 engine, according to the preferred embodiment of the present invention, and, FIG. 7 is a schematic diagram of the engine test box, depicting connections for an adapter harness for implement and power train controller of G and H series loaders, according to the preferred embodiment of the present invention.

Referring next to FIG. 6, a schematic diagram of the test box 10, depicting connections for an adapter harness for a 3456 engine 200, according to the preferred embodiment of the present invention is shown. The adapter harness for a 3456 engine 200 provides a is provided with a fourth connector 205 which mates with the ECM connector 50 (as shown in FIG. 1 and FIG. 2), or with the ECM extension cable 90 (as shown in FIG. 2) and is envisioned to be a 160-7690 PLUG AS AMP 776-2412 or equal. The distal end of the extension cable is provided with a second proprietary connector 210 specific to the engine under test 75 (as shown in FIG. 2) under test. The second proprietary connector 210 is envisioned to be a 160-7690 PLUG AS AMP 776-2411 or equal. The connections from the pins of the fourth connector 205 are connected to the second proprietary connector 210 as shown.

Figure 7:
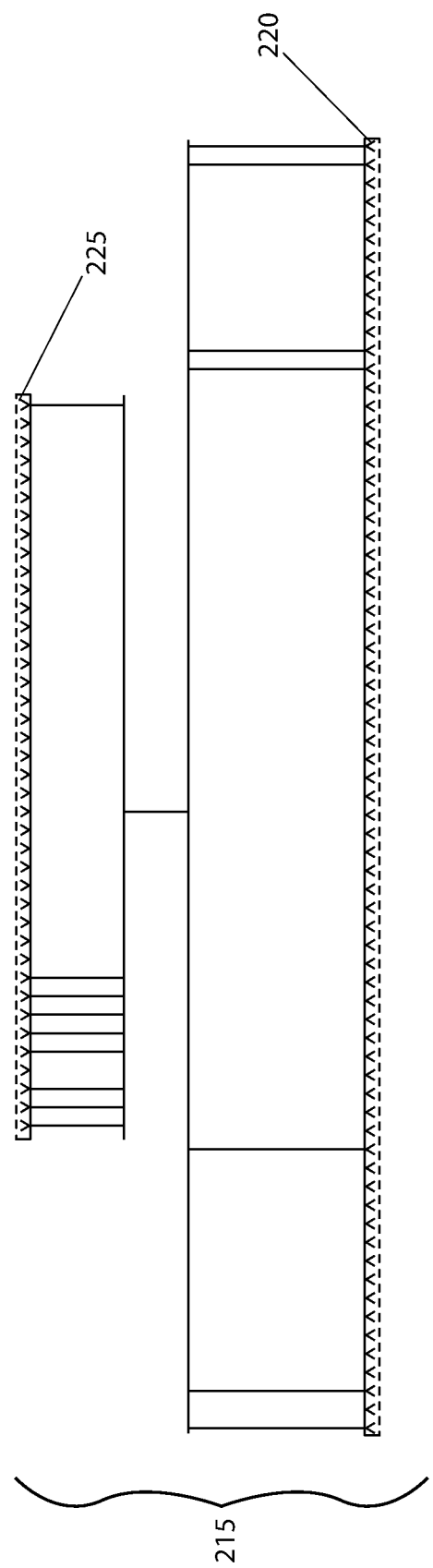

Referring to FIG. 7, a schematic diagram of the test box 10, depicting connections for an adapter harness for implement and power train controller of G and H series loaders 215, according to the preferred embodiment of the present invention is disclosed. The adapter harness for implement and power train controller of G and H series loaders 215 provides a is provided with a fifth connector 220 which mates with the ECM connector 50 (as shown in FIG. 1 and FIG. 2), or with the ECM extension cable 90 (as shown in FIG. 2) and is envisioned to be a 160-7690 PLUG AS AMP 776-2412 or equal. The distal end of the extension cable is provided with a third proprietary connector 225 specific to the engine under test 75 (as shown in FIG. 2) under test. The third proprietary connector 225 is envisioned to be a Deutch AEC 16-405D 101-0205or equal. The connections from the pins of the fourth connector 205 are connected to the second proprietary connector 210 as shown.

2. Operation of the Preferred Embodiment

The preferred embodiment of the present invention can be utilized by the common user in a simple and effortless manner with little or no training. It is envisioned that the test box 10 would be constructed in general accordance with FIG. 1 through FIG. 7. The user would procure the test box 10 from conventional procurement channels such as diesel repair and part stores, truck repair suppliers, mechanical supply houses, mail order and internet supply houses and the like. Special attention would be paid to the correct ECM adapter cable 85 to ensure that is the proper one for the engine under test 75.

After procurement and prior to utilization, the test box 10 would be prepared in the following manner: with the engine under test 75 on a proper test stand, connections would be made from the ECM connector 50 to the ECM port 80 using the ECM extension cable 90 as necessary, from the starter solenoid connection 55 to the starter solenoid 95, from the com adapter connection 60 to the communication module 105, and from the power supply connection 70 to the battery system 110. At this point in time, the engine test box 10 is ready for utilization.

During utilization of the test box 10, the following procedure would be initiated: the engine under test 75 would be started and run via manipulation of the off/run/start switch 30; the voltage would be monitored on the voltage readout 20, the fuel injectors may be enabled or disabled by manipulation of the injector disable/enable switch 25, while engine activities and performance is monitored via the communication module 105; the ECM COM power fuse 35 and the ECM circuit breaker 40 allows for power protection to the ECM port 80; the start solenoid circuit breaker 45 allows for protection of the starter solenoid 95; and finally other engine diagnostic and repair activities take place.

After use of the test box 10, the various electrical connections as aforementioned described are removed, and the repaired engine under test 75 is returned to service; the test box 10 is stored until needed again.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:
1. An engine test box, comprising:
a box-like enclosure having a top face, the top face of the box-like enclosure includes a voltage readout, an injector disable/enable switch, and an off/run/start switch all deposed on a first side of the engine test box and an ECM COM power fuse, an ECM circuit breaker, and a start solenoid circuit breaker all deposed on a second side of the engine test box;
a main power switch disposed adjacent an upper central part of the box-like enclosure;
an ECM connector and a starter solenoid connection disposed on an upper face of the box-like enclosure;
a com adapter connection disposed on the second side of the engine test box;
a throttle control knob and a power supply connection disposed on the first side of the engine test box;
a plurality of CAN data links and a plurality of data wires connecting a plurality of pins of the ECM connector to the com adapter connection; and
a plurality of positive and negative lines connected at a terminal block, the terminal block functions as a bus connection.

2. The engine test box, according to claim 1, wherein the box-like enclosure is located in close proximity to an engine under test.

3. The engine test box, according to claim 2, wherein a starter solenoid connection is connected to a starter solenoid on the engine under test via a starter cable.

4. The engine test box, according to claim 3, wherein the starter solenoid connection and the power supply connection are interconnected to a main power relay and a starter relay which are enabled by the main power switch.

5. The engine test box, according to claim 1, wherein the ECM connector is connected to the ECM port on the engine under test via an ECM adapter cable and an ECM extension cable.

6. The engine test box, according to claim 5, wherein the ECM extension cable is provided with a first connector which mates with the ECM connector.

7. The engine test box, according to claim 6, wherein the first connector is a 160-7690 PLUG AS AMP 776-2412.

8. The engine test box, according to claim 1, wherein a second connector mates with the starter solenoid connection and a power supply connection and provides an electrical connection to a starter solenoid on the starter as well as to a battery system.

9. The engine test box, according to claim 8, wherein the second connector is a plurality of high current spring clamps.

10. The engine test box, according to claim 1, wherein the com adapter connection on the box-like enclosure is connected to a communication module.

11. The engine test box, according to claim 10, wherein the com adapter connection on the box-like enclosure is connected to a computer.

12. The engine test box, according to claim 1, wherein the power supply connection is connected to a battery system via a battery cable.

13. The engine test box, according to claim 12, wherein the battery cable carries power from the battery system to an engine under test.

14. The engine test box, according to claim 1, wherein the throttle control knob is connected to the ECM connector by a sensor supply positive wire and a sensor return positive wire.

15. The engine test box, according to claim 1, wherein the engine test box is connected to an adapter harness for a CAT 3408E engine or a CAT 3412E engine.

16. The engine test box, according to claim 15, wherein the adapter harness for the CAT 3408E and the 3412E engines includes a third connector which mates with the ECM connector or with an ECM extension cable.

17. The engine test box, according to claim 16, wherein a plurality of pins of the third connector are connected to a first connector with a distal end of the ECM extension cable specific to the engine under test.

18. The engine test box, according to claim 15, wherein the adapter harness for a 3456 engine is provided with a fourth connector which mates with the ECM connector or with an ECM extension cable.

19. The engine test box, according to claim 18, wherein a plurality of pins of the fourth connector are connected to a second connector with a distal end of the ECM extension cable specific to the engine under test.

20. The engine test box, according to claim 15, wherein an adapter harness for a 3456 engine is provided with a fifth connector which mates with the ECM connector or with an ECM extension cable.

* * * * *